United States Patent
Rieck

(10) Patent No.: US 7,667,451 B2
(45) Date of Patent: Feb. 23, 2010

(54) METHOD FOR DETERMINING SIZE OF OPTICAL DISC INSERTED INTO OPTICAL DISC DRIVE

(75) Inventor: Marcel Rieck, Taipei (TW)

(73) Assignee: Philips & Lite-On Digital Solutions Corporation, Neihu District, Taipei (TW)

( * ) Notice: Subject to any disclaimer, the term of this patent is extended or adjusted under 35 U.S.C. 154(b) by 308 days.

(21) Appl. No.: 11/947,796

(22) Filed: Nov. 30, 2007

(65) Prior Publication Data

US 2009/0144762 A1 Jun. 4, 2009

(51) Int. Cl.
*G01R 19/00* (2006.01)

(52) U.S. Cl. .................. 324/76.11; 324/710; 369/53.23; 720/695

(58) Field of Classification Search .............. 324/76.11, 324/710, 716; 369/53.23; 720/695
See application file for complete search history.

(56) References Cited

U.S. PATENT DOCUMENTS

2003/0099167 A1* 5/2003 Lee .................. 369/30.36
2004/0076098 A1* 4/2004 Choi ................ 369/53.23

* cited by examiner

*Primary Examiner*—Vincent Q Nguyen
(74) *Attorney, Agent, or Firm*—Winston Hsu

(57) ABSTRACT

A method of determining a size of an optical disc inserted into an optical disc drive is disclosed. The method includes driving a turntable motor of the optical disc drive to rotate the optical disc at a predetermined rotation frequency for reading data stored on the optical disc, measuring a rotation frequency of the turntable motor, applying a kick-pulse voltage to the turntable motor of the optical disc drive for a predetermined period of time, measuring a change in the rotation frequency of the turntable motor after applying the kick-pulse voltage, comparing the change in the rotation frequency of the turntable motor to a threshold value, and determining that the optical disc is an 8 cm disc when the change in the rotation frequency of the turntable motor is above the threshold value.

12 Claims, 8 Drawing Sheets

METHOD FOR DETERMINING SIZE OF OPTICAL DISC INSERTED INTO OPTICAL DISC DRIVE

BACKGROUND OF THE INVENTION

1. Field of the Invention

The invention relates to an optical disc drive, and more particularly, to a method of determining the size of an optical disc inserted into optical disc drive.

2. Description of the Prior Art

In typical optical disc drives, users can insert media having different sizes. The compact disc (CD) standard specifies two sizes: 8 cm and 12 cm in diameter. Apart from being able to report the size of the inserted disc to the user, this information might also be necessary for the Turn-Table-Motor (TTM) controller that drives and controls the speed of the disc. Since the moment of inertia of an 8 cm disc and a 12 cm disc differ greatly, a different TTM controller might be required for rotating each type of disc in order to maintain fast, stable, and robust control over the rotation speed of the disc.

FIG. 1 is a partially cut-off perspective view of an optical disc drive of the prior art. In FIG. 1, an optical disc 1 is placed on a turntable 2 and is rotated by a turntable motor 3. Opposed to the lower face of the optical disc 1 there is provided an optical pickup 4 which is supported by a guide rail 5 and a driving screw 6. The optical pickup 6 moves in the radial direction of the optical disc 1 by rotation of the driving screw with a stepping motor 7.

In a typical optical disc drive, the decision of determining whether an 8 cm disc or a 12 cm disc is present in the drive is made in one of two ways. The size can be determined mechanically using switches in the disc-loader module. This method involves additional switches in the loader system, and therefore increases the bill of materials of the optical disc drive. On the other hand, the size can also be determined at start-up using the so-called kick phase. This method is a software solution for detecting the disc size, and therefore potentially does not affect the bill of materials of the optical disc drive.

For the software method, in the kick phase a constant voltage is applied to the TTM that drives the disc in order to accelerate the disc quickly to the target velocity where the TTM takes over velocity control of the TTM. The duration of this kick phase, i.e. from the start of the applied constant voltage until the TTM controller takes over, is a measure of the mass of inertia of the load driven by the TTM and therefore a measure of the disc size.

The disadvantage of the software method of the prior art is that the disc speed needs to be measured during the complete kick phase, or at least at the very end of the kick phase. Although the speed signal might be available for certain TTM types, e.g. for brushless TTM types where in most cases the motor electronics provides such a signal, this is not the case for brush TTM motor types. Here extra effort, and hence cost, must be made to extract this kind of information. The TTM velocity control after the kick phase on these brush TTM drives is based on the data rate of the information stored on the disc. This data rate speed signal, which in a CD module or a digital versatile disc (DVD) module is usually provided by the data acquisition phase locked loop (PLL), becomes available at a later stage of the start-up phase (after several other control loops have been closed and data can be read) and can therefore not be used to determine the disc speed at the end of the kick phase.

Another disadvantage of deciding between 8 and 12 cm discs during the kick phase is that this only works when the initial disc speed equals zero at the start of the kick phase. This means the disc must be slowed down to a standstill before the kick phase starts. Otherwise the detection might provide incorrect results, such as a 12 cm disc being detected as an 8 cm disc, which might be catastrophic if the TTM controller depends on a correct detection of the disc size.

SUMMARY OF THE INVENTION

It is therefore one of the primary objectives of the claimed invention to provide a method for quickly determining the size of an optical disc placed in an optical disc drive, where the method can be implemented in software or firmware.

According to an exemplary embodiment of the claimed invention, a method of determining a size of an optical disc inserted into an optical disc drive is disclosed. The method includes driving a turntable motor of the optical disc drive to rotate the optical disc at a predetermined rotation frequency for reading data stored on the optical disc, measuring a rotation frequency of the turntable motor, applying a kick-pulse voltage to the turntable motor of the optical disc drive for a predetermined period of time, measuring a change in the rotation frequency of the turntable motor after applying the kick-pulse voltage, comparing the change in the rotation frequency of the turntable motor to a threshold value, and determining that the optical disc is an 8 cm disc when the change in the rotation frequency of the turntable motor is above the threshold value.

According to another exemplary embodiment of the claimed invention, a method of determining a size of an optical disc inserted into an optical disc drive is disclosed. The method includes driving a turntable motor of the optical disc drive to rotate the optical disc at a predetermined rotation frequency for reading data stored on the optical disc, measuring a rotation frequency of the turntable motor, applying a kick-pulse voltage to the turntable motor of the optical disc drive, measuring a change in the rotation frequency of the turntable motor while the kick-pulse voltage is being applied, comparing the change in the rotation frequency of the turntable motor to a threshold value, and determining that the optical disc is an 8 cm disc and stopping applying the kick-pulse voltage when the change in the rotation frequency of the turntable motor is above the threshold value. If the threshold value is not exceeded with a predetermined period of time then a 12 cm disc is detected.

These and other objectives of the present invention will no doubt become obvious to those of ordinary skill in the art after reading the following detailed description of the preferred embodiment that is illustrated in the various figures and drawings.

DETAILED DESCRIPTION

The present invention describes an improved "software" method for detecting if an optical disc is 8 cm or 12 cm. This detection method takes place during the normal TTM control phase, i.e. after the kick phase, using the data rate of the information stored on the disc as a speed signal. Therefore, this method does not suffer from the above mentioned disadvantages of the prior art methods, and has no impact on the bill of materials either.

Figure 1:
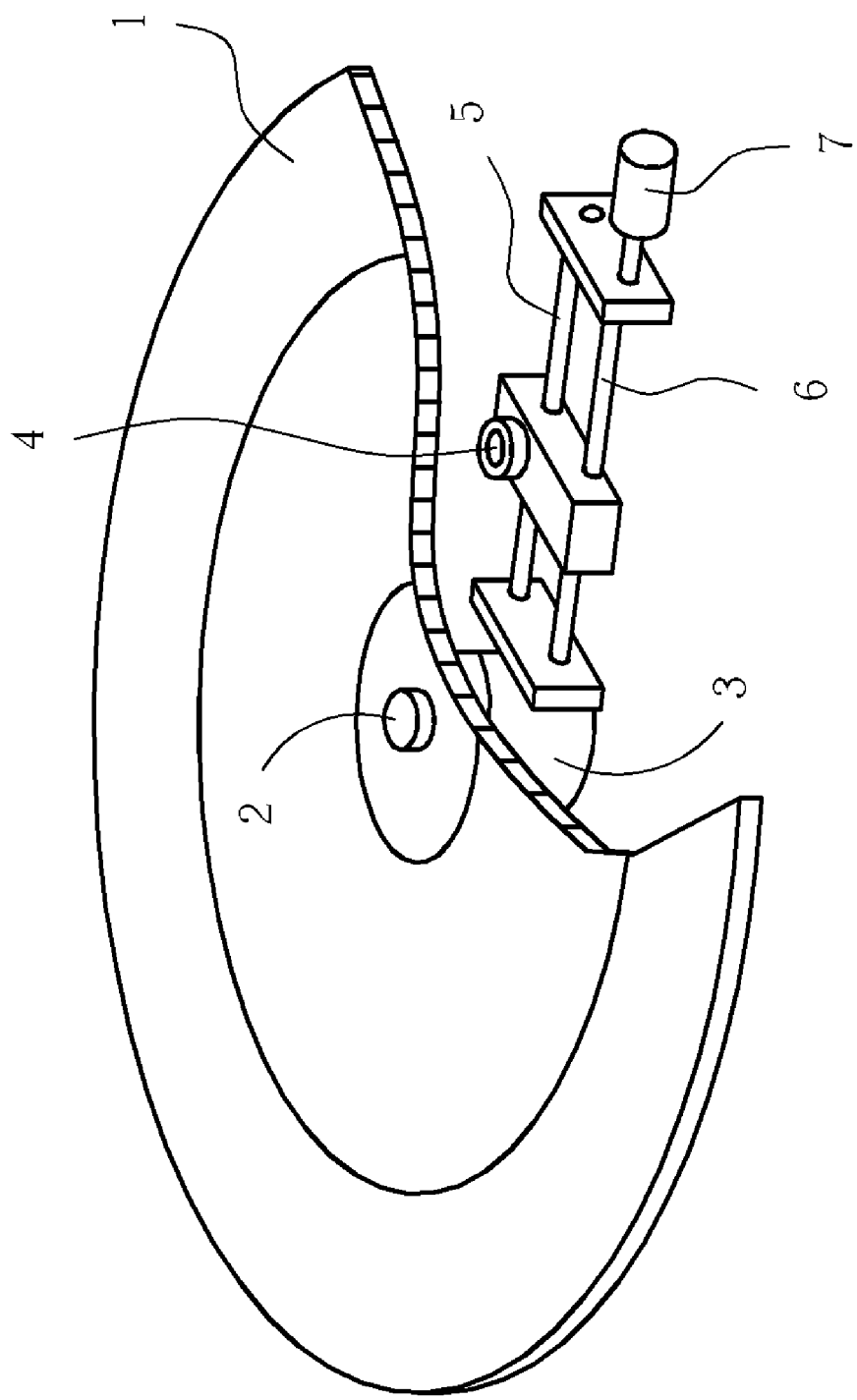
FIG. 1 is a partially cut-off perspective view of an optical disc drive of the prior art.
Figure 2:
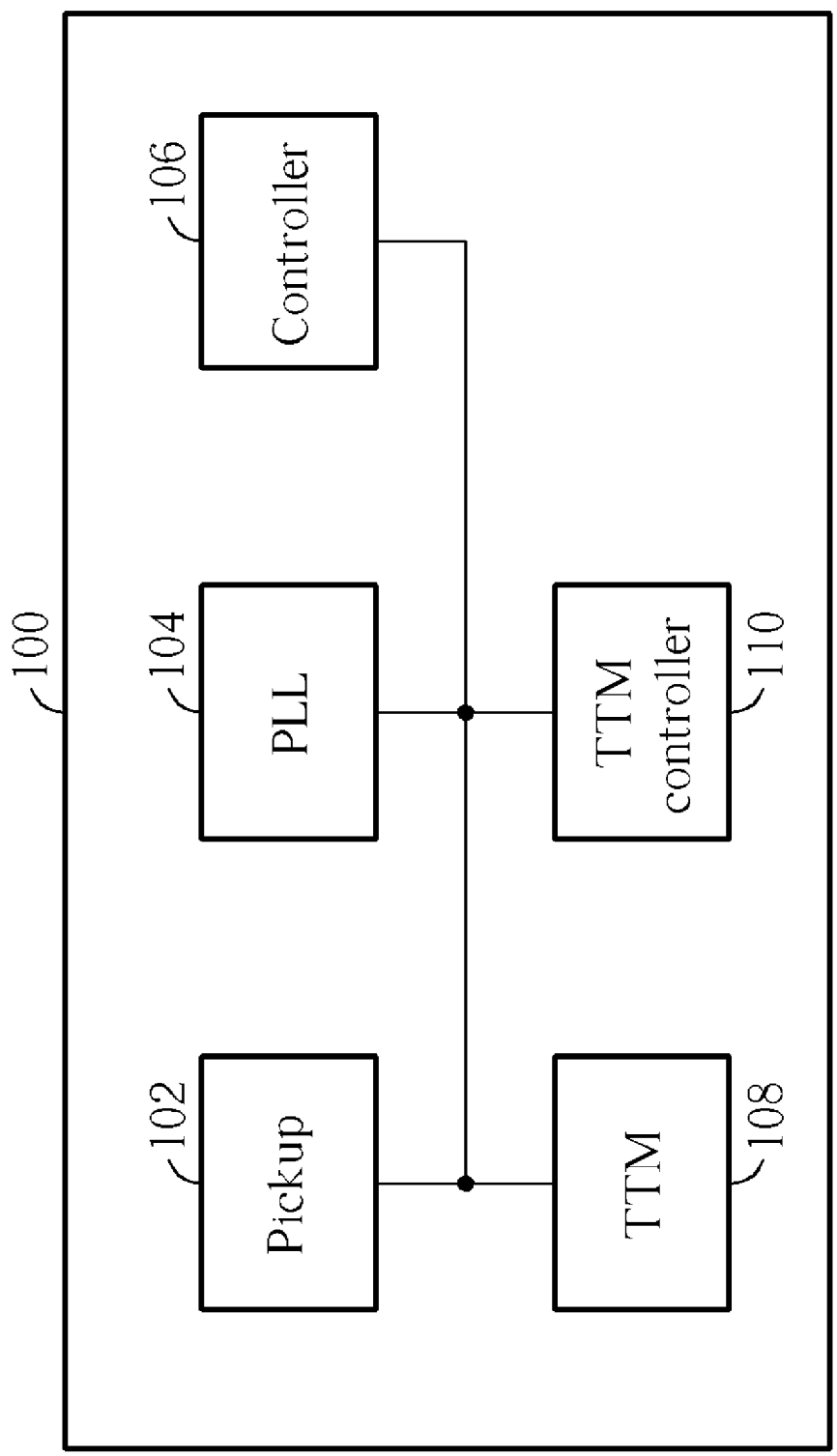
FIG. 2 for a simplified block diagram of an optical disc drive of the present invention.

Please refer to FIG. 2 for a simplified block diagram of an optical disc drive 100 of the present invention. Only those parts of the optical disc drive 100 pertaining to the present invention are shown, including an optical pickup 102, a PLL 104, a controller 106, a TTM 108, and a TTM controller 110. Detecting the size of the optical disc takes place after the TTM controller 110 has been turned on. This means that the disc speed can be deduced from the data rate of the information stored on the disc. Typically, the frequency of the data acquisition PLL 104 on a CD/DVD system, when locked on the clock frequency of the data on the disc, can be used as a reliable disc velocity indicator. However, other methods known to those skilled in the art can also be used to determine the disc speed.

For a small period of time, the TTM control loop executed by the TTM controller 110 is disturbed by applying a kick-pulse to the TTM 108 instead of the normal control signal. The kick-pulse can either have a higher voltage value or a lower voltage value than the normal control signal applied to the TTM 108. A kick-pulse having a higher voltage value than normal will accelerate the TTM 108, whereas a kick-pulse having a lower voltage value than normal (also known as a brake-pulse) will decelerate the TTM 108. For simplicity, the following discussion will assume that the kick-pulse applies a higher voltage value than the normal control signal. During this kick-pulse, the TTM 108 will accelerate and the frequency of the TTM 108 will increase. How much the frequency of the TTM 108 increases during the kick-pulse, which can be determined by the maximum absolute value of the speed error of the TTM controller 110, depends on the size of the loaded disc.

Figure 3:
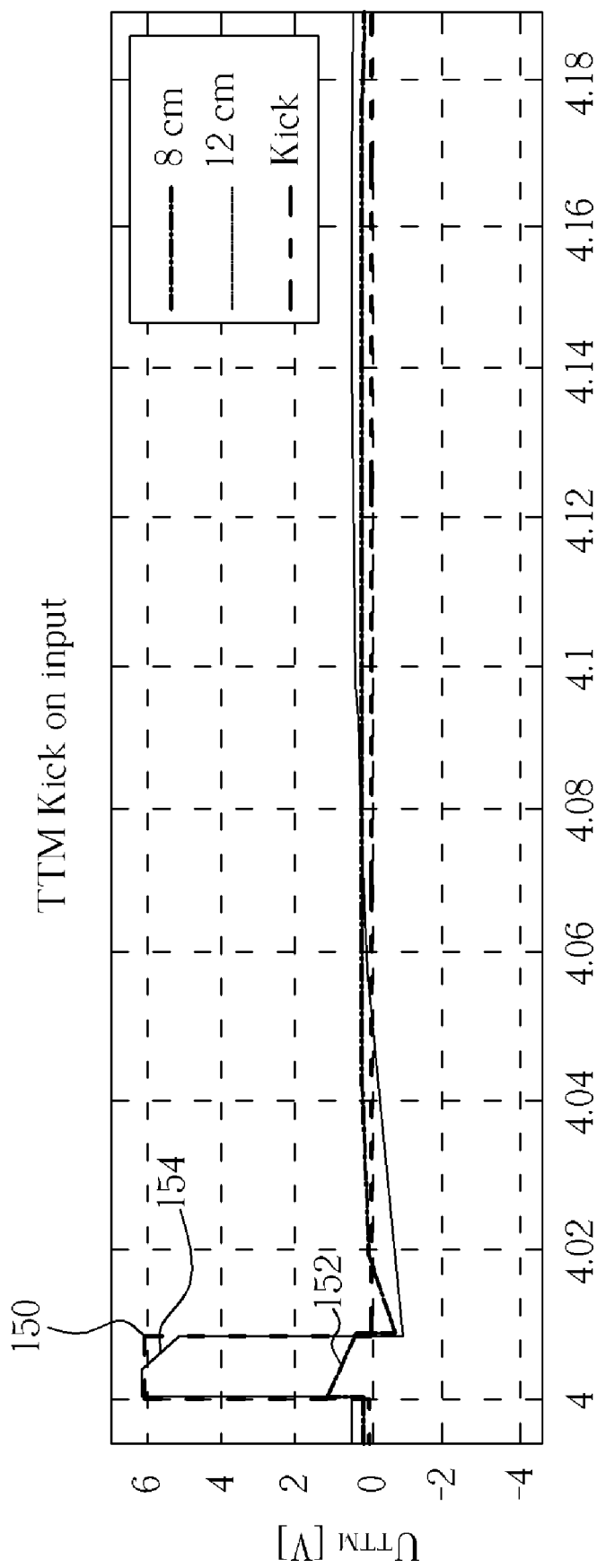
FIG. 3 shows the effect of a kick-pulse during closed loop operation of the TTM.

Please refer to FIGS. 3-6. FIG. 3 shows the effect of a kick-pulse 150 during closed loop operation of the TTM 108. The vertical axis represents the voltage applied to the TTM 108, whereas the horizontal axis represents time. For a brief moment, the kick-pulse 150 is applied to the TTM 108, which suddenly increases the rotational velocity of the TTM 108 and the optical disc loaded on it. Two additional lines are shown in FIG. 3, with line 152 representing the effects of the kick-pulse 150 on an 8 cm disc and line 154 representing the effects on a 12 cm disc.

Figure 4:
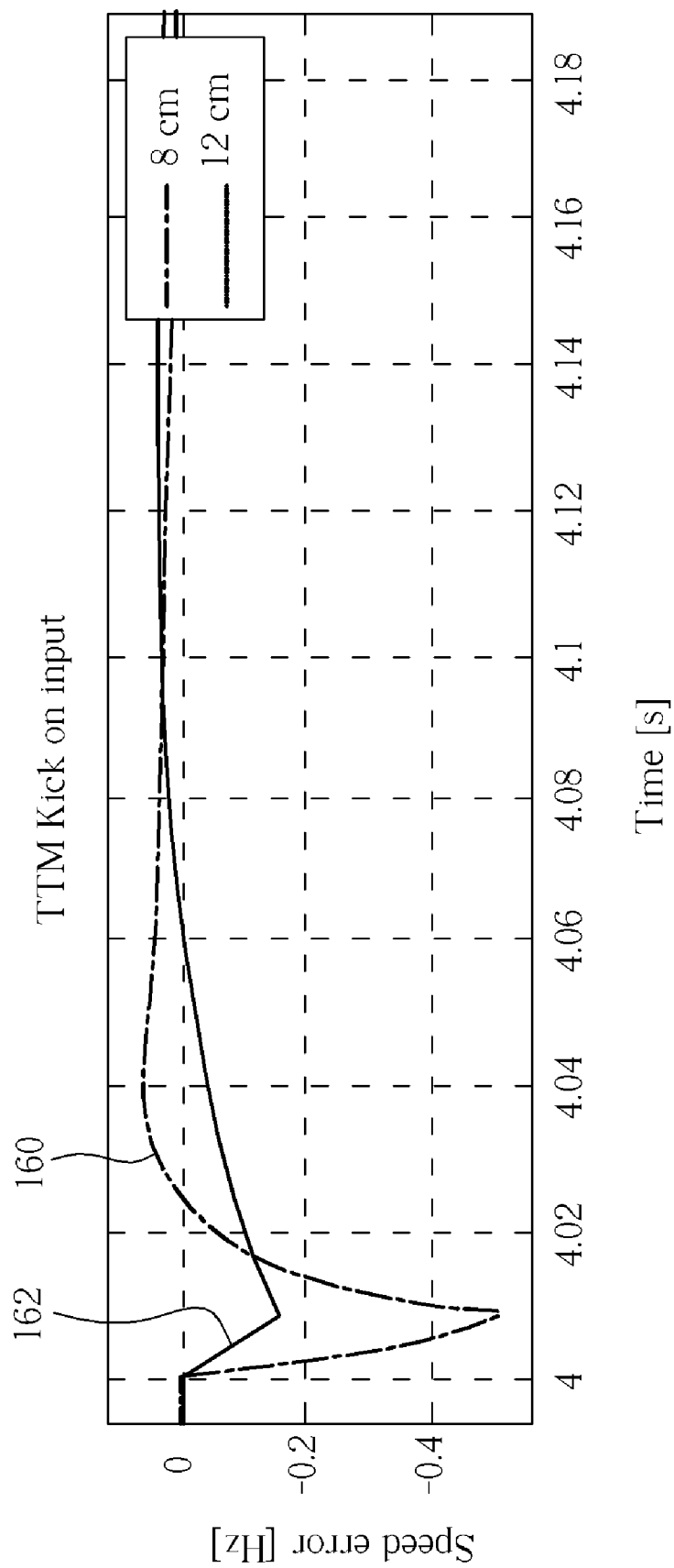
FIG. 4 is another graph showing the effect of the kick-pulse on the speed error of the disc.
Figure 5:
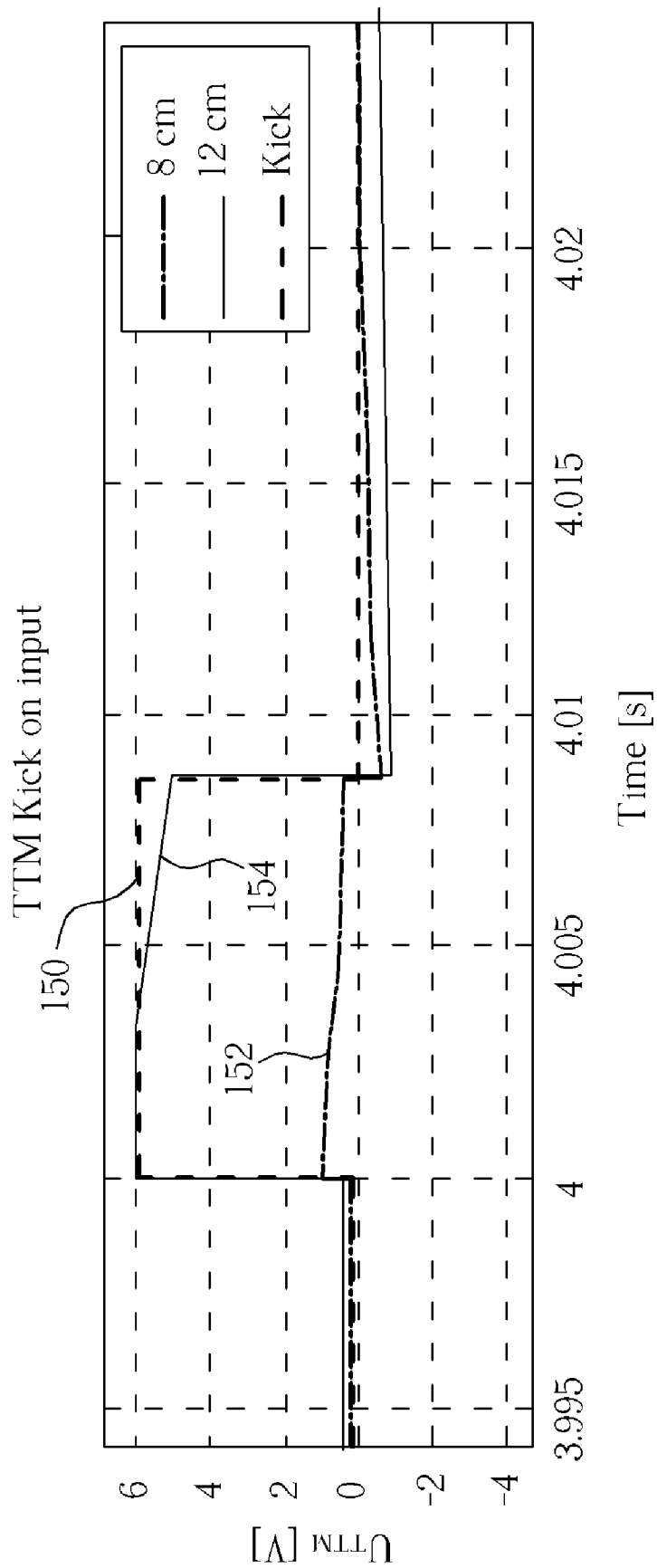
FIG. 5 is a zoomed in version of FIG. 3.
Figure 6:
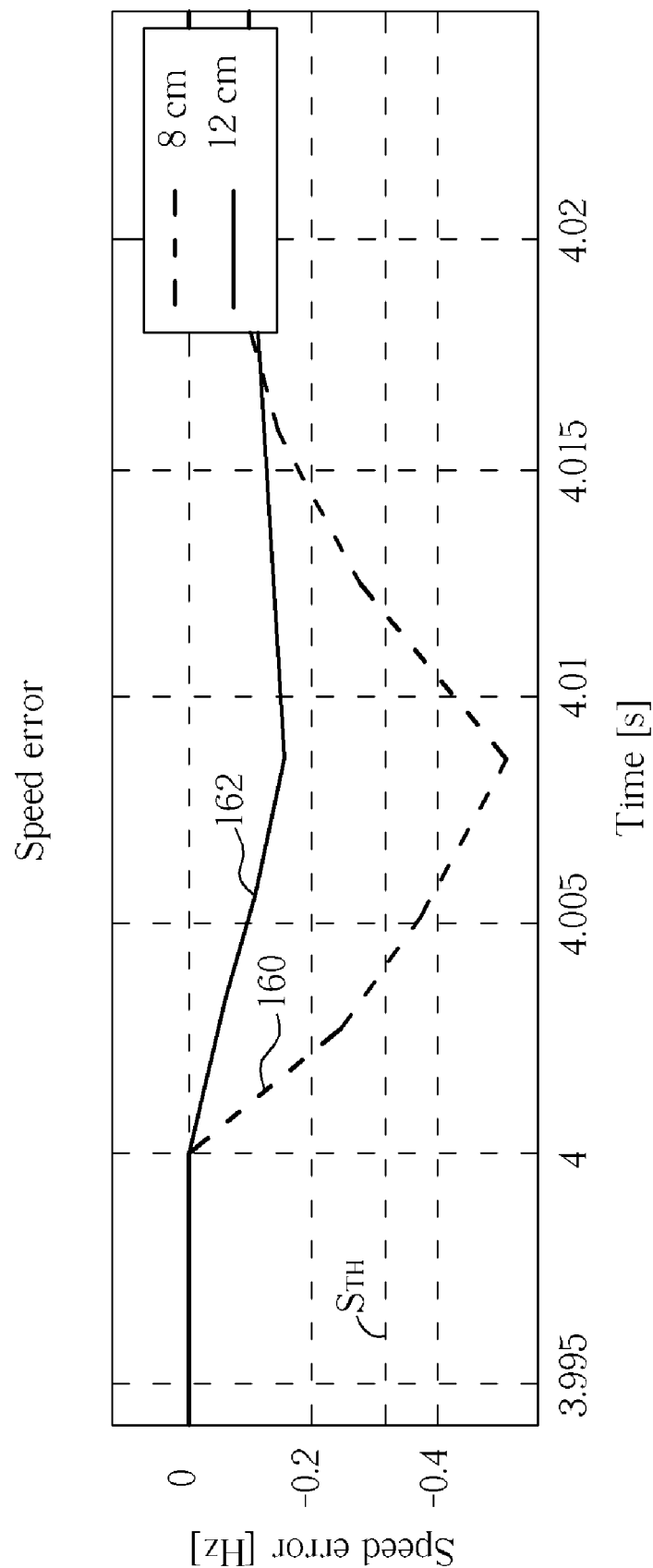
FIG. 6 is a zoomed in version of FIG. 4.

FIG. 4 is another graph showing the effect of the kick-pulse 150 on the speed error of the disc. When a disc is rotating regularly at an approximately constant speed, the speed error of the disc is zero. However, when the sudden kick-pulse 150 is applied to the TTM 108, a speed error is produced since the speed of the disc is suddenly much larger than it was expected to be. As shown in FIG. 4, line 160 represents the speed error associated with an 8 cm disc, whereas line 162 represents the speed error associated with a 12 cm disc. As seen in the graph, the speed of the disc, as indicated by the speed error, will change more for an 8 cm disc than for a 12 cm disc. This is because an 8 cm disc has less mass than a 12 cm disc, so the effects of the kick-pulse 150 are more pronounced. FIGS. 5 and 6 are zoomed in versions of the charts shown in FIGS. 3 and 4, respectively. Additionally, FIG. 6 shows a speed error threshold value $S_{TH}$ that can be used as a basis for comparison with the speed errors of the 8 cm disc and the 12 cm disc respectively shown in lines 160 and 162.

Since only the 8 cm disc will experience a speed error threshold value $S_{TH}$ that crosses the speed error threshold value $S_{TH}$, the speed error threshold value $S_{TH}$ offers a convenient way to determine the size of the optical disc inserted in the optical disc drive 100.

Figure 7:
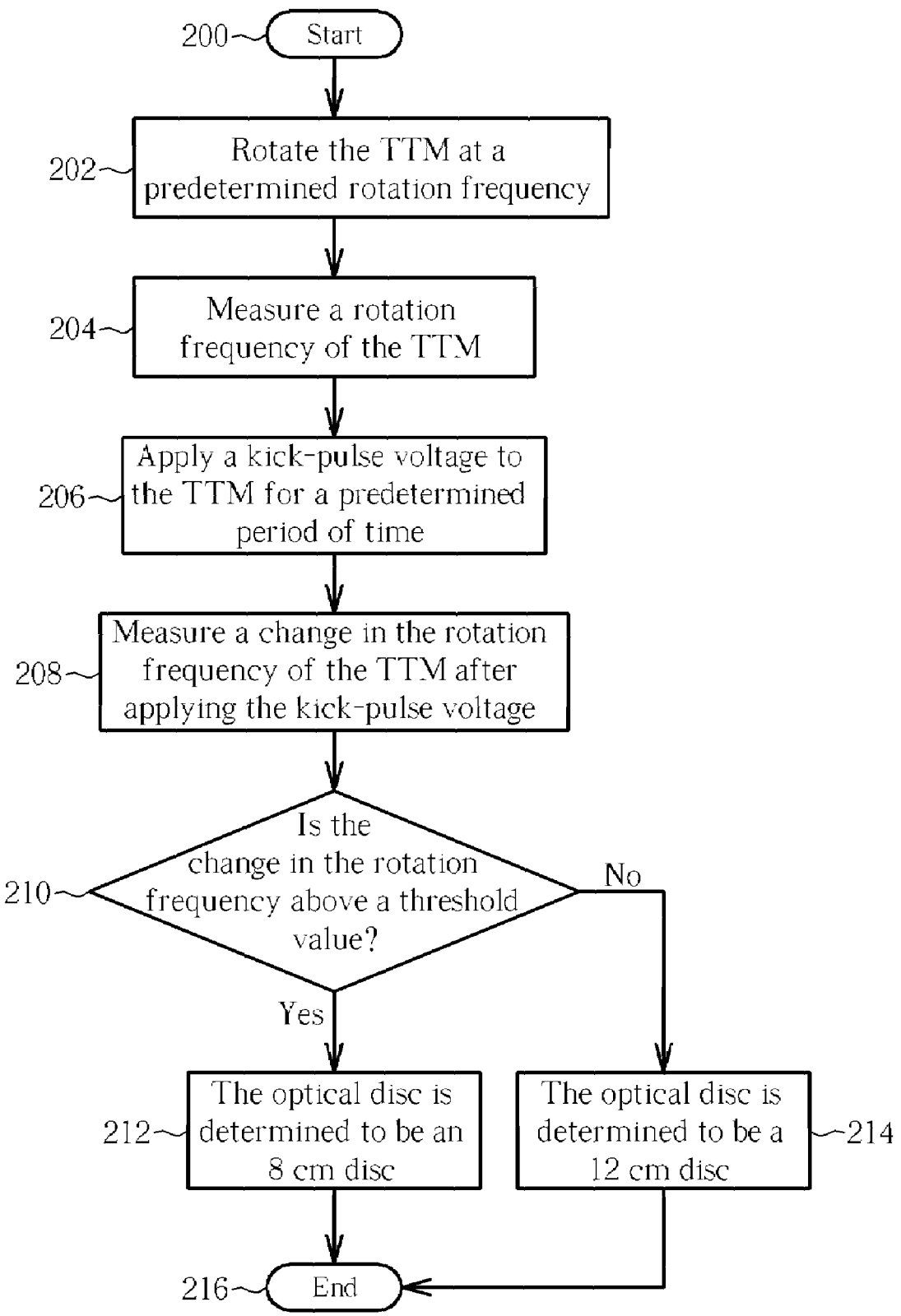
FIG. 7 is a flowchart illustrating a method for determining the size of an optical disc inserted into the optical disc drive according to a first embodiment of the present invention.

Please refer to FIG. 7. FIG. 7 is a flowchart illustrating a method for determining the size of an optical disc inserted into the optical disc drive 100 according to a first embodiment of the present invention. Steps contained in the flowchart will be explained below.

Step 200: Start.

Step 202: Drive the TTM 108 to rotate at a predetermined rotation frequency in order to read data from the optical disc.

Step 204: Measure a rotation frequency of the TTM 108. The frequency is estimated using the data rate of data read from the optical disc.

Step 206: Apply a kick-pulse 150 to the TTM 108 for a predetermined period of time.

Step 208: Measure a change in the rotation frequency of the TTM 108 after applying the kick-pulse 150. As explained above, this change is measured by measuring the speed error of the TTM controller 110.

Step 210: Determine if the change in the rotation frequency indicated by the speed error is above the speed error threshold value $S_{TH}$. If the speed error is larger than the speed error threshold value $S_{TH}$, the disc go to step 212. Otherwise, go to step 214.

Step 212: The optical disc is determined to be an 8 cm disc.

Step 214: The optical disc is determined to be a 12 cm disc.

Step 216: End.

In the first embodiment of the present invention, the kick-pulse 150 is applied for a fixed period of time. Upon completion of the kick-pulse 150, the speed error of the TTM controller 110 is measured. In the second embodiment of the present invention, it is not necessary to wait for the kick-pulse 150 to be applied for the fixed period of time since the size of the disc may become apparent before the fixed period of time is complete.

Figure 8:
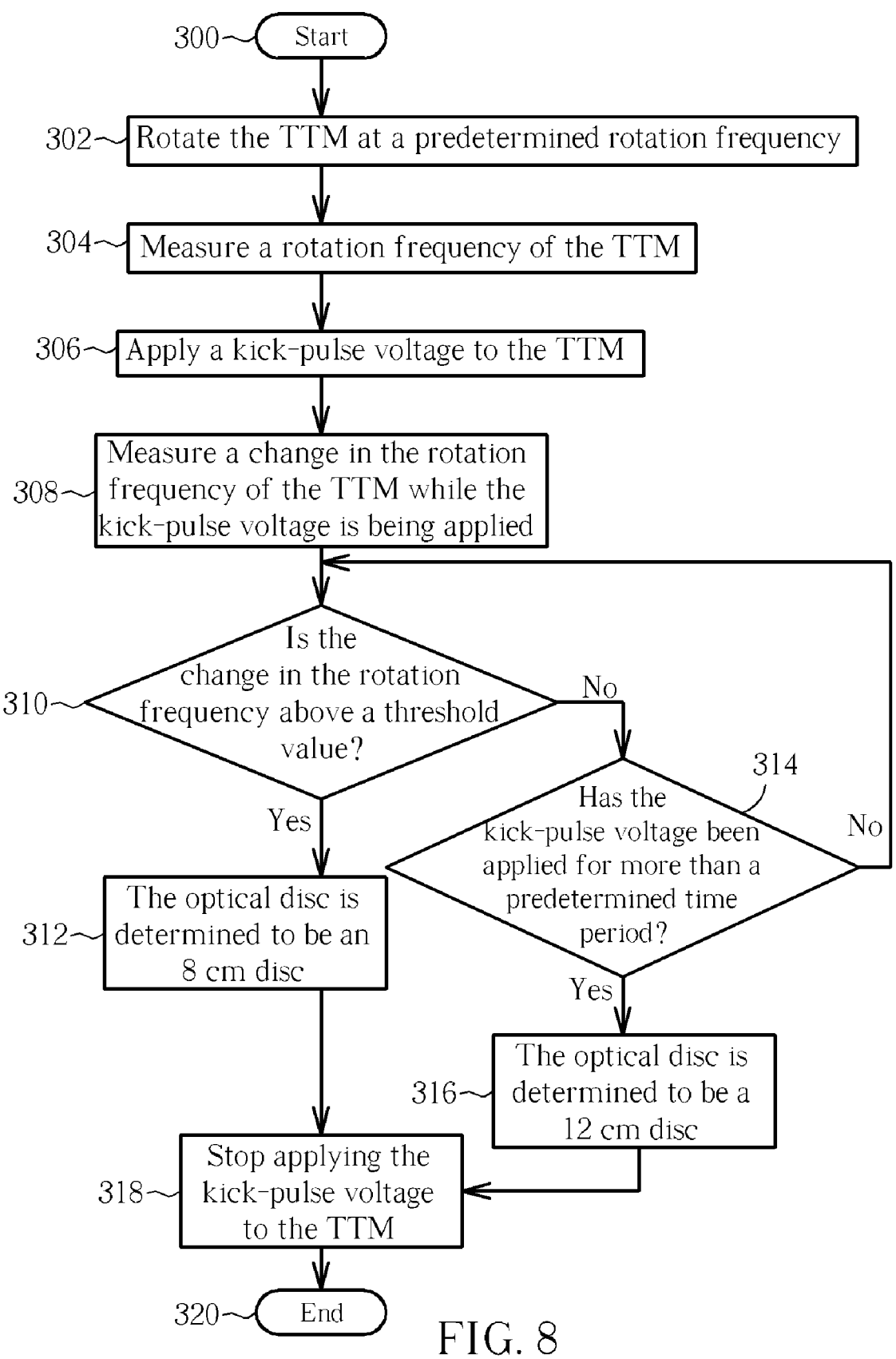
FIG. 8 is a flowchart illustrating a method for determining the size of an optical disc inserted into the optical disc drive according to a second embodiment of the present invention.

Please refer to FIG. 8. FIG. 8 is a flowchart illustrating a method for determining the size of an optical disc inserted into the optical disc drive 100 according to a second embodiment of the present invention. Steps contained in the flowchart will be explained below.

Step 300: Start.

Step 302: Drive the TTM 108 to rotate at a predetermined rotation frequency in order to read data from the optical disc.

Step 304: Measure a rotation frequency of the TTM 108. The frequency is estimated using the data rate of data read from the optical disc.

Step 306: Apply a kick-pulse 150 to the TTM 108.

Step 308: Measure a change in the rotation frequency of the TTM 108 while the kick-pulse 150 is being applied. This change is measured by measuring the speed error of the TTM controller 110.

Step 310: Determine if the change in the rotation frequency indicated by the speed error is above the speed error threshold value $S_{TH}$. If the speed error is larger than the speed error threshold value $S_{TH}$, the disc go to step 312. Otherwise, go to step 314.

Step 312: The optical disc is determined to be an 8 cm disc.

Step 314: Determine if the kick-pulse 150 has been applied for more than a predetermined time period. If the kick-pulse has already been applied for more than the predetermined time period, go to step 316. Otherwise, go back to step 310.

Step 316: The optical disc is determined to be a 12 cm disc.

Step 318: Stop applying the kick-pulse 150 to the TTM 108.

Step 320: End.

The first and second embodiment methods are very similar to each other, but the second embodiment stops applying the kick-pulse 150 as soon as it is apparent that the optical disc is an 8 cm disc. In effect, the second embodiment measures the period of time that the kick-pulse 150 is applied for. If it is applied for a period of time exceeding the predetermined time period in which the speed error of the disc has not yet exceeded the speed error threshold value $S_{TH}$, then the disc is a 12 cm disc. Otherwise, if the speed error exceeds the speed error threshold value $S_{TH}$ before the predetermined period of time is up, the disc is an 8 cm disc. Since the speed error threshold value $S_{TH}$ is located between the maximum speed error values of an 8 cm disc and a 12 cm disc, the size of the disc can be easily determined by comparing the speed error to the speed error threshold value $S_{TH}$.

The methods of both the first and second embodiments provide fast detection of the size of the disc. The amount of time required is in the range from 1 ms to 10 ms for the kick-pulse 150 to be applied and around 200 ms more for the TTM controller 110 to recover from the applied disturbance. The kick-pulse 150 used in the first and second embodiments does not interfere with normal playback as long as the frequency change stays well within the range that can be handled by the data acquisition PLL 104.

The present invention provides away to discern between disc sizes, and can be applied to any type of optical disc such as a CD, a DVD, laserdisc, minidisk, Blu-ray disc, High Definition DVD (HD DVD) disc, and so on. The present invention offers a way to classify the size of the disc into two different sizes, although more sizes could be used as well through the use of additional threshold values.

Those skilled in the art will readily observe that numerous modifications and alterations of the device and method may be made while retaining the teachings of the invention.

What is claimed is:

1. A method of determining a size of an optical disc inserted into an optical disc drive, the method comprising:
    driving a turntable motor of the optical disc drive to rotate the optical disc at a predetermined rotation frequency for reading data stored on the optical disc;
    measuring a rotation frequency of the turntable motor;
    applying a kick-pulse voltage to the turntable motor of the optical disc drive for a predetermined period of time;
    measuring a change in the rotation frequency of the turntable motor after applying the kick-pulse voltage;
    comparing the change in the rotation frequency of the turntable motor to a threshold value; and
    determining that the optical disc is an 8 cm disc when the change in the rotation frequency of the turntable motor is above the threshold value.

2. The method of claim 1 further comprising determining that the optical disc is a 12 cm disc when the change in the rotation frequency of the turntable motor is below the threshold value.

3. The method of claim 1, wherein the rotation frequency of the turntable motor is estimated using a data acquisition clock rate of the optical disc drive.

4. The method of claim 3, wherein the data acquisition clock rate of the optical disc drive is produced using a phase locked loop (PLL).

5. The method of claim 1, wherein the optical disc is a compact disc (CD).

6. The method of claim 1, wherein the optical disc is a digital versatile disc (DVD).

7. A method of determining a size of an optical disc inserted into an optical disc drive, the method comprising:
    driving a turntable motor of the optical disc drive to rotate the optical disc at a predetermined rotation frequency for reading data stored on the optical disc;
    measuring a rotation frequency of the turntable motor;
    applying a kick-pulse voltage to the turntable motor of the optical disc drive;
    measuring a change in the rotation frequency of the turntable motor while the kick-pulse voltage is being applied;
    comparing the change in the rotation frequency of the turntable motor to a threshold value; and
    determining that the optical disc is an 8 cm disc and stopping applying the kick-pulse voltage when the change in the rotation frequency of the turntable motor is above the threshold value.

8. The method of claim 7 further comprising determining that the optical disc is a 12 cm disc if the change in the rotation frequency of the turntable motor does not exceed the threshold value within a predetermined period of time.

9. The method of claim 7, wherein the rotation frequency of the turntable motor is estimated using a data acquisition clock rate of the optical disc drive.

10. The method of claim 9, wherein the data acquisition clock rate of the optical disc drive is produced using a phase locked loop (PLL).

11. The method of claim 7, wherein the optical disc is a compact disc (CD).

12. The method of claim 7, wherein the optical disc is a digital versatile disc (DVD).

* * * * *